United States Patent
Groseclose

(10) Patent No.: US 10,860,965 B2
(45) Date of Patent: Dec. 8, 2020

(54) SYSTEM AND METHOD FOR TRACKING ASSETS

(71) Applicant: TransVoyant Inc., Alexandria, VA (US)

(72) Inventor: Dennis William Groseclose, Great Falls, VA (US)

(73) Assignee: Transvoyant, Inc., Alexandria, VA (US)

( * ) Notice: Subject to any disclaimer, the term of this patent is extended or adjusted under 35 U.S.C. 154(b) by 309 days.

(21) Appl. No.: 15/653,142

(22) Filed: Jul. 18, 2017

(65) Prior Publication Data

US 2018/0018618 A1 Jan. 18, 2018

Related U.S. Application Data

(60) Provisional application No. 62/363,667, filed on Jul. 18, 2016.

(51) Int. Cl.

| | |
|---|---|
| *G06Q 10/08* | (2012.01) |
| *H04W 84/18* | (2009.01) |
| *H04W 4/02* | (2018.01) |
| *H04W 4/80* | (2018.01) |
| *G06Q 10/00* | (2012.01) |
| *H04W 8/00* | (2009.01) |

(52) U.S. Cl.
CPC ............ *G06Q 10/08* (2013.01); *H04W 84/18* (2013.01); *G06Q 10/00* (2013.01); *H04W 4/02* (2013.01); *H04W 4/80* (2018.02); *H04W 8/005* (2013.01)

(58) Field of Classification Search
None
See application file for complete search history.

(56) References Cited

U.S. PATENT DOCUMENTS

| | | |
|---|---|---|
| 4,872,122 A | 10/1989 | Altschuler et al. |
| 6,512,455 B2 | 1/2003 | Finn et al. |
| 7,231,114 B2 | 6/2007 | Jenkins et al. |
| 7,265,668 B1 | 9/2007 | Brosius |

(Continued)

OTHER PUBLICATIONS

International Searching Authority, International Search Report for International Application PCT/US14/57670 dated Feb. 18, 2015, 1pg.

(Continued)

*Primary Examiner* — Fateh M Obaid
(74) *Attorney, Agent, or Firm* — Duane Morris LLP

(57) ABSTRACT

Methods and systems and method of tracking the location of an object. The method includes assigning a unique first device identifier, associating the first device with an object, and storing the unique identifier and an identifier for the object associated with the first device in a location server. The method also includes transmitting a first message containing the unique identifier, but not the first device location, receiving the first message at a second device, and transmitting a second message from the second device containing the unique identifier and a second device location. The method also includes, at the location server, receiving the second message, associating the location of the second device with the first device, storing the location of the second device, receiving a request for the location of the object, and in response to the request, providing the unique identifier and the second device location.

20 Claims, 6 Drawing Sheets

(56) References Cited

U.S. PATENT DOCUMENTS

| | | | |
|---|---|---|---|
| 7,477,815 B2 | 1/2009 | Jenkins et al. | |
| 8,047,432 B2 | 11/2011 | Breed | |
| 8,332,344 B2 | 12/2012 | Kato | |
| 8,359,223 B2 | 1/2013 | Chi et al. | |
| 8,364,519 B1 | 1/2013 | Basu et al. | |
| 8,490,869 B2 | 7/2013 | Brown | |
| 8,620,343 B1 | 12/2013 | Lau et al. | |
| 8,738,425 B1 | 5/2014 | Basu et al. | |
| 8,841,859 B2 | 9/2014 | Chemel et al. | |
| 8,994,546 B2 | 3/2015 | Breed et al. | |
| 9,031,889 B1 | 5/2015 | Basu et al. | |
| 9,230,211 B1 | 1/2016 | Basu et al. | |
| 9,558,468 B2* | 1/2017 | Donlan | G06Q 50/28 |
| 2002/0062251 A1* | 5/2002 | Anandan | G06Q 30/02 705/14.64 |
| 2004/0215532 A1 | 10/2004 | Boman et al. | |
| 2005/0222811 A1* | 10/2005 | Jakobson | H04L 41/0631 702/183 |
| 2006/0009240 A1 | 1/2006 | Katz | |
| 2006/0173857 A1 | 8/2006 | Jackson | |
| 2006/0184527 A1 | 8/2006 | Chi et al. | |
| 2006/0271563 A1 | 11/2006 | Angelo et al. | |
| 2007/0087756 A1 | 4/2007 | Hoffberg | |
| 2007/0195712 A1 | 8/2007 | Thayer et al. | |
| 2010/0057660 A1* | 3/2010 | Kato | G06F 11/008 706/47 |
| 2010/0223211 A1 | 9/2010 | Johnson et al. | |
| 2011/0050424 A1 | 3/2011 | Cova et al. | |
| 2011/0071964 A1 | 3/2011 | Horvitz | |
| 2011/0193710 A1 | 8/2011 | McIlvain et al. | |
| 2011/0295628 A1 | 12/2011 | Priyadarshan et al. | |
| 2012/0101974 A1 | 4/2012 | Duan et al. | |
| 2012/0131139 A1 | 5/2012 | Siripurapu et al. | |
| 2012/0233315 A1 | 9/2012 | Hoffman et al. | |
| 2012/0271949 A1 | 10/2012 | Radhakrishnan et al. | |
| 2012/0296899 A1 | 11/2012 | Adams | |
| 2013/0191523 A1 | 7/2013 | Buck et al. | |
| 2013/0214909 A1* | 8/2013 | Meijers | H04W 4/029 340/10.5 |
| 2013/0217332 A1 | 8/2013 | Altman | |
| 2014/0378163 A1 | 12/2014 | Dicke et al. | |
| 2018/0032997 A1* | 2/2018 | Gordon | G06Q 20/3224 |

OTHER PUBLICATIONS

International Searching Authority, International Preliminary Report on Patentability for PCT/US14/57670 dated Mar. 29, 2016, 8pgs.

Bouha, N., "Modeling, Multi Agent Approach and Tools for Decision Support Systems Applied Urban Road Traffic," ISKO-Maghreb, IEEE Conference Publications, 3rd International Symposium 2013, 7pgs.

Geffre, J., et al., "Strategic Threat Probabilities with Hierarchical Spatiotemporal Predictions," IEEE Intelligent Systems Computer Society, Nov./Dec. 2015, pp. 72-80.

Drachen, A., et al., "Spatial Game Analytics and-Visualization," Computational Intelligence in Games (CIG), IEEE Conference Publications, 2013, 8pgs.

Cheng, J., "Temporal Deontic Relevant Logic as the Logical Basis for Decision Making Based on Anticipatory Reasoning," 2006 IEEE International Conference on Systems, Man, and Cybernetics, Oct. 8-11, 2006, pp. 1036-1041.

International Searching Authority, International Search Report for International Application PCT/US15/28282 dated Aug. 4, 2015, 1pg.

European Patent Office, Extended European Search Report for corresponding EP Application No. 14847371.3 dated May 15, 2017, 8pgs.

European Patent Office, Extended European Search Report for corresponding EP Application No. 15810275.6 dated Sep. 26, 2017, 7pgs.

International Searching Authority, International Search Report for corresponding International Application No. PCT/US17/42629 dated Oct. 6, 2017, 1pg.

https://web.archive.org/web/20161216115504/http://sendum.com/pt300-package-tracker/ Sendum—PT300 Package Tracker, 2016, 8 pgs.

* cited by examiner

SYSTEM AND METHOD FOR TRACKING ASSETS

CROSS-REFERENCE TO RELATED APPLICATIONS

This application is a non-provisional application and claims priority to U.S. Provisional Patent Application Ser. No. 62/363,667, filed on Jul. 18, 2016, the entirety of which is herein incorporated by reference.

FIELD

The present disclosure is generally directed to the tracking of assets. More specifically, the present application is directed to a low duty cycle transmitter for providing a unique identifier ("ID") which can be received by a communication device. The communication device can be unaffiliated with the transmitter, but can send (e.g. broadcast) the unique ID along with location information associated with the communication device.

DESCRIPTION OF THE RELATED ART

There is an increasing need to track assets. The tracked assets may be, for example, a shipping container, a rail car, a shipping box, or each item in a shipping box. For examples, some importers may wish to track their products that are placed in a shipping container at a foreign port for shipment to the U.S. The shipping container may be placed on a ship with thousands of other containers for delivery to a U.S. port. The shipping container may be removed from the ship and placed on, for example, a railway car for delivery to a distribution center. At the distribution center, the shipping container may sit for days outside of a warehouse prior to a delivery, and may be placed on a truck trailer or rail car for delivery to its final destination. At the distribution center, individual packages from the container may be dispersed throughout a warehouse, moved periodically within the warehouse by workers using, for example, forklifts, cranes, etc., and may be stored for days in various intra-warehouse locations prior to delivery. The individual packages from the container may be placed on different modes of transport (e.g. truck trailer, rail car, etc.) for delivery from a distribution center to a retail store. At the retail store, the individual packages, or the individual products (e.g. merchandise such as a television, clothing, etc.) of the individual packages, may be stocked by retail store employees in various locations (e.g. floors, shelves) within the store, and may be stored in various intra-store locations prior to purchase by a retail customer. Upon purchase of an individual package, or an individual product of an individual package by a retail customer, the respective package or product may be placed in, for example, a customer shipping package for delivery (e.g. in a mail truck) from the retail store to the customer's home or, for example, in a retail store bag for the customer's transport to his/her home.

Along the way, it is desirable for the owner of the merchandise in the shipping container to track the location of the container, the individual packages in the container, the individual products in the individual packages, or the individual products in a customer shipping package, for logistical management reasons or to optimally and continuously match supply to demand, and/or match cargo to conveyance, in real-time, and/or to ensure timely and accurate delivery of customer purchased merchandise. In some cases, it is desirable that a downstream owner (e.g. a retail store company), who is not the owner of the merchandise when it is being transported in a shipping container (e.g. over ocean, air, rail, or truck), or stored in a warehouse in individual packages, but will own the merchandise when it purchases the individual packages (or products in the individual packages) from an upstream supplier or when such packages or products are delivered by an upstream supplier, to track the location of the container, individual packages, or individual products, to optimally and continuously match supply to demand, and/or match cargo to conveyance, in real-time.

For example, by tracking the shipping container as it traverses the ocean, it can be determined whether the container will arrive in accordance with its scheduled arrival at the U.S. port. If the container is delayed, such as, for example, if the ship is delayed, or if the container is stuck in a port (e.g. in customs), it may be necessary to arrange for alternative rail, or truck, or air transport for the container. Likewise, by tracking the location of the container, the individual packages in the container, the individual products in the individual packages, or the individual products in a customer shipping package along each step and mode of the transport, it can facilitate the planning and movement of the tracked assets. Additionally, by matching and/or reconciling, the dynamic container, package, merchandise, and conveyance (e.g. air, rail, truck, ocean mode of transport) data streams, against static Bill of Lading (BOL), schedule and/or route data, and/or forensic data (e.g. learned ship schedule, stop sequencing behavior, port turnaround time, etc.), cargo (e.g. containers, packages, and/or products) is optimally and continuously matched to conveyance in real-time.

Several prior art tracking devices are available for tracking assets. For example some prior art tracking devices include functionality to determine the location of the tracking device and can communicate that location to a tracking server. The tracking devices may include a GPS receiver in order to determine its location and a transmitter to transmit the location information using the cellular telephone network. The tracking devices may include a cellular communication capability, SIM card, and require a subscription to cellular services, to determine its coarse grained location. These type of devices having GPS, and/or cellular communication, functionality are expensive to purchase, are heavy, have too large of a form factor to work in an individual package and/or merchandise use case, contain battery technology (e.g. lithium ion, lithium metal) that certain carriers (e.g. air) will not transport, etc. In addition, having the cellular communications protocol embedded in the tracking device requires recurring fees paid to the cellular carrier for use of the cellular network. The cost of using a tracking device of this nature can be prohibitively expensive if many assets are required to be tracked, particularly where the assets are individually tracked to many end consumers. For example, a single ship can transport hundreds of shipping containers, and each container can include tens or hundreds of individual packages and/or thousands of individual products. Thus, if it is desired to track all of the individual products from their initial delivery from a manufacturing plant to their respective ultimate destinations, hundreds of thousands of tracking devices would be needed.

The costs of a tracking device include not only the hardware and software of the device that gives its location, timestamp, and communication functionality, but may also include communications costs for access to a communications network to allow the location data for the tracking device to be transmitted to a location server. In addition, prior art tracking devices that include location and communication functionality have significant energy requirements to power the processors that control the location and communication functionality, are heavy, have too large of a form factor to work in an individual package and/or individual product use case, contain battery technology (e.g. lithium ion, lithium metal) that certain carriers (e.g. air) will not transport, etc. Thus, it is not practical to use prior art tracking devices to track thousands, or even hundreds, of packages or products. Moreover, conventionally, cargo is linked to conveyance manually which cannot provide real-time results due to significant time lag and such manual techniques also introduce errors in such delayed results. These techniques and delayed, inaccurate results are not useful to merchandise owners and prospective owners.

The present disclosure is directed to a robust tracking device that avoids the expenses, complexity, weight, form factor, and safety concerns associated with location functionality and communication functionality of prior art asset tracking devices.

BRIEF DESCRIPTIONS OF THE DRAWINGS

SUMMARY

Figure 1:
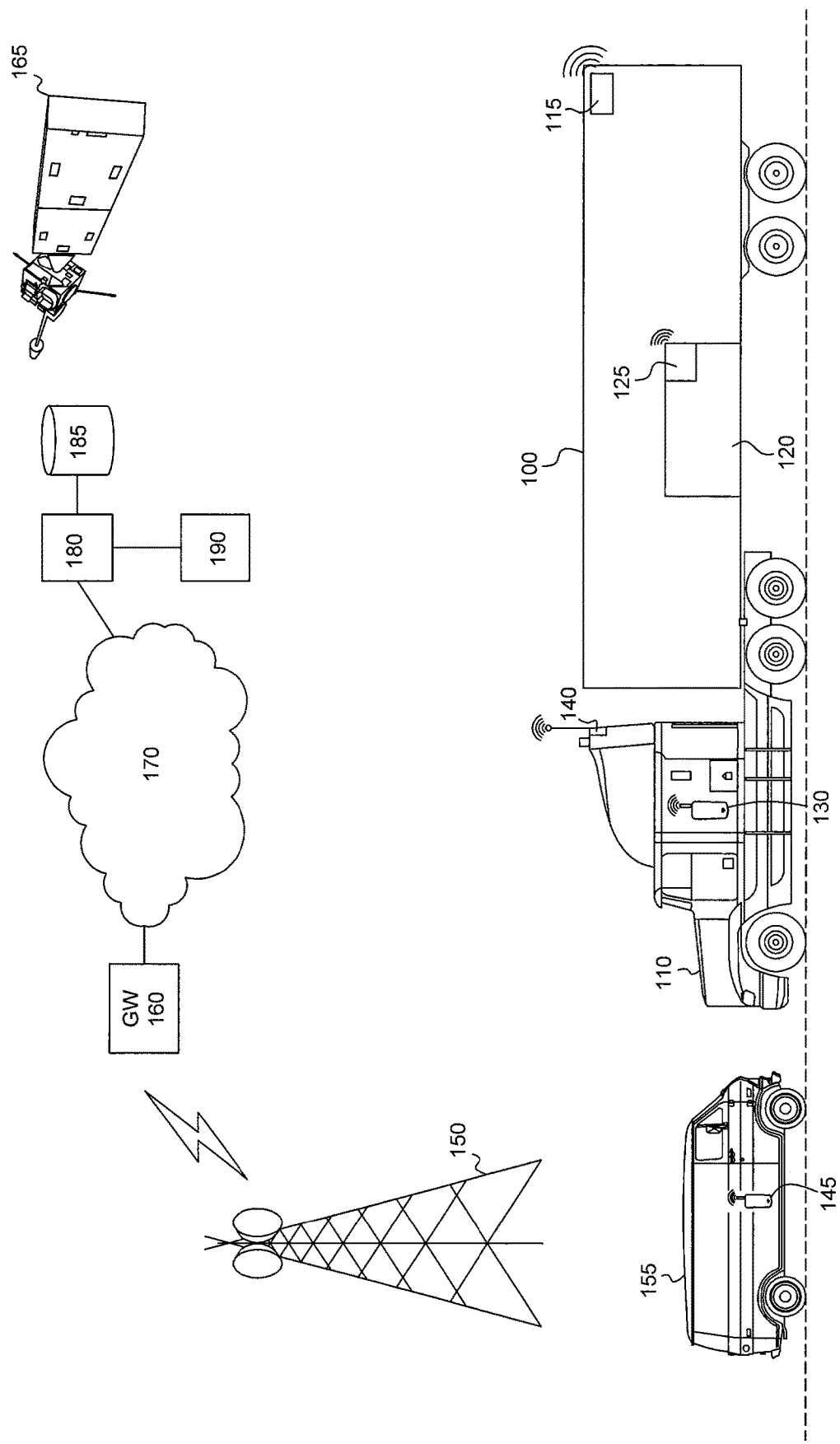
FIG. 1 is a simplified pictorial representation of one embodiment of the present disclosure.

In some embodiments of the present disclosure, a method of tracking the location of an object is provided. The method includes assigning a unique identifier for a first communication device. The first communication device does not have the capability to determine its location. The method also includes associating the first communication device with an object, and storing the unique identifier and an identifier for the object associated with the first communication device in a location server. The method also includes transmitting a first message containing the unique identifier. The first message does not include the location of the first communication device. The method also includes receiving the first message at a second communication device, and transmitting a second message from the second communication device containing the unique identifier and a location of the second communication device. The method also includes, at the location server, receiving the second message, associating the location of the second communication device with the first communication device, storing the location of the second communication device, receiving a request for the location of the object, and in response to the request, providing the unique identifier and the second communication device location.

In some embodiments of the present disclosure, a system for tracking the location of an object is provided. The system includes a first communication device having a unique identifier. The first communication device is associated with an object and does not have the capability to determine its location. The system also includes a location server configured to store the unique identifier of the first communication device and an identifier for the object associated with the first communication device. The system also includes a second communication device configured to receive a first message transmitted by the first communication device. The first message includes the unique identifier of the first communication device and does not include the location of the first communication device. The second communication device is also configured to transmit a second message including the unique identifier of the first communication device and a location of the second communication device. The location server is also configured to receive the second message from the second communication device, associate the location of the second communication device with the first communication device, store the location of the second communication device, receive a request for the location of the object, and, in response to the received request, provide the unique identifier of the first communication device and the location of the second communication device.

In some embodiments of the present disclosure, a system for tracking the location of an object is provided. The system includes a first communication device having a unique identifier. The first communication device is associated with an object and does not have the capability to determine its location. The system also includes a location server and a database associated with the location server and configured to store the unique first communication device identifier and an identifier for the object associated with the first communication device. The system also includes a second communication device configured to receive a first message transmitted by the first communication device. The first message includes the unique first communication device identifier and does not include the location of the first communication device. The second communication device is also configured to transmit a second message including the unique first communication device identifier and a second communication device location. The location server is also configured to receive the second message from the second communication device, associate the second communication device location with the first communication device, store the second communication device location in the database, receive a request for the location of the object, and, in response to the received request, provide the unique first communication device identifier and the second communication device location.

DETAILED DESCRIPTION

In one embodiment, a first communication device (e.g. a proximity beacon) using Bluetooth Low Energy (BLE), LTE Direct, WiFi, or another short range communication protocol receivable by a second communication device is provided. When establishing a connection, the beacon may emit a communication signal including a unique identifier for the beacon. The second communication device may include specialized hardware and/or software to passively monitor for the short range wireless communications of the beacon. In one embodiment, the beacon signal only includes the unique identifier of the wireless beacon and the second communication device does not need to communicate any information to the beacon. In this embodiment, the beacon includes transmitting functionality but does not include functionality for determining its own location, timing, acceleration, altitude, or include any sensors. This type of architecture greatly decreases the price, complexity, weight, and form factor, and increases the safety, of the proximity beacon as compared to prior art tracking devices. Importantly, this type of architecture also greatly reduces the energy needs of the priority beacon as compared to prior art tracking devices.

In another embodiment, when the second communication device detects the beacon signal, a handshake protocol may be established which results in the second communication device and the beacon ramping up in power and establishing a connection. This connection may further enable the second communication device to communicate information to the wireless beacon. The use of a short range communication protocol between the second communication device and the beacon conserves energy and takes advantage of a communications protocol that is ubiquitous on communication devices such as, for example, mobile telephones (e.g. smart phones), access points, etc.

In one embodiment, the first communication device (e.g. beacon) can be battery powered. In another embodiment, the first communication device (e.g. beacon) can be solar powered. In another embodiment, the first communication device can be powered by kinetic energy harvesting. In another embodiment, the first communication device can be powered by RF harvesting. In another embodiment, where AC power is available, the first communication device can be used with an adapter to receive power from the AC power source.

One embodiment of the present disclosure is illustrated in FIG. 1. A shipping container 100 may have associated with it a first communication device (e.g. beacon) 115. The beacon 115 may include a transmitting module and a power source. The transmitting module can use BLE, LTE Direct, WiFi, or another short range communication protocol. The power source can be a battery, and in one embodiment may be a rechargeable battery where the beacon includes a solar charging module. This rechargeable functionality may be particularly suitable for beacons used in outdoor environments. In another embodiment, the power source may be a rechargeable battery where the beacon includes a kinetic energy harvesting module. In another embodiment, the power source may be a rechargeable battery where the beacon includes a RF harvesting module.

The beacon may include an identification module which includes a programmable memory for storing a unique identifier associated with the beacon. The identification module may be programmable by a user using a suitable user interface. The unique identifier may be randomly generated or selectable by the user. The identification module may also be programmed with additional identifying information suitable for the circumstances. For example, in one embodiment, where the beacon 115 is associated with a shipping container that will be transported on a ship, the identification module may be programmed with the name of the ship carrying the container, the origination and destination ports, the contents of the container, the owner of the contents, Bill of Lading (BOL) data, stock keeping unit (SKU) data, etc. The programmable memory can be reprogrammed over the air to change the unique identifier or to add additional information to assist in tracking the device. For example, the programmable memory can add additional information as the beacon 115 is moved from one transportation mode to another mode such as when a package is moved form a ship to an airplane in order to create a link between the two modes. By way of another example, the programmable memory can add additional information as the tracking device is moved from one owner to another owner such as when an individual package and/or product is purchased and/or delivered by a supplier to a retail store company in order to create a link between the two owners.

Container 100 may include a plurality of packages 120. In one embodiment, each package 120 includes a first communication device (e.g. beacon) 125. The beacon 125 may have similar functionality as beacon 115, but in all cases, it further includes the functionality of transmitting a unique identifier for each package 120. Programmable memory of an identification module of beacon 125 may be further be programmed with unique identifiers for each package 120. Each package 120 may include a plurality of products (not shown). In one embodiment, each product (not shown) includes a beacon (e.g. 115, 125). The individual merchandise beacon may have similar functionality as beacon 115 (125), but in all cases, it further includes the functionality of transmitting a unique identifier for each product (not shown). Programmable memory of an identification module of individual product beacon (e.g. 115, 125) may be further be programmed with unique identifiers for each product (not shown).

With continued reference to FIG. 1, the shipping container 100 may be placed on another mode of transport or conveyance such as, for example, a truck trailer 110. Truck trailer 110 may also be a rail car, a plane, or another mode of transport or conveyance. Truck trailer 110 may pick up the shipping container 100 at a destination port for delivery of the container 100, the individual packages 120 contained therein, or the individual products (not shown) contained in individual packages 120, at one or more destinations.

The first communication device (e.g. beacon) 115, 125 may transmit a first message. In one embodiment, first communication device (e.g. beacon) 115 (125) may periodically transmit a broadcast transmission. A second communication device (e.g. wireless transmitter) 130 (140) may receive the first message (e.g. broadcast transmission) from the beacon 115 (125). The wireless transmission from beacon 115 (125) includes the unique identifier associated with the beacon. Wireless transmitter 130 (140) includes BLE, LTE Direct, WiFi or another short range communication protocol to receive the unique identifier from the beacon 115 (125), and may include, for example, a cellular communication protocol to communicate with a base station 150 associated with a cellular communication network. Wireless transmitter 130 (140) may include a WiFi communication protocol to communicate with a WiFi router (not shown), access point (not shown), hot spot (not shown), ad hoc node (not shown), or other device associated with a wireless network (e.g. a local area network (LAN), wireless mesh network, etc.) and the Internet. In one embodiment, the wireless transmitter 130 (140) may be a smart phone having Bluetooth functionality and communicating with the base station tower 150 using LTE communications protocol. In another embodiment, the wireless transmitter 130 (140) may be a smart phone having Bluetooth functionality and communicating with a WiFi hot spot (not shown) using a WiFi communication protocol.

In another embodiment, the second communication device (e.g. wireless transmitter) 130 (140) may be a wireless access point having Bluetooth functionality and communicating with another wireless access point using a wireless access point communications protocol (e.g. 802.11F, Inter-Access Point Protocol (IAPP), CAPWAP, LWAPP, etc.). In yet another embodiment, the wireless transmitter 130 (140) may communicate with both the beacon 115 (125) and a WiFi communication network using the WiFi protocol. The user of the wireless transmitter 130 (140) may not even be aware of the communications between the wireless transmitter and the beacon 115 (125), or the subsequent communication of the unique identifier of the beacon 115 (125) to, for example, the base station 150 or the WiFi hot spot (not shown). For example, the wireless transmitter may be a smart phone that is being used to play a game application. The game application may require, as part of its protocol, to use the location of the smart phone and send periodic messages having the smart phone location to a server. If the smart phone receives the unique identifier transmission from a beacon 115 (125), the smart phone can include the beacon identifier with its periodic transmission of the smart phone location such that the beacon can be associated with that smart phone location.

In order to conserve energy and cost of the device, first communication device (e.g. beacon) 115 (125) may not include functionality to determine its location or other positioning functionality or sensors of any kind, e.g., temperature, acceleration, altitude. In one embodiment, second communication device (e.g. wireless transmitter) 130 (140) includes location functionality to determine its own location. For example, wireless transmitter 130 (140) may be a smart phone containing a global positioning satellite (GPS) chipset for determining its location through satellite positioning techniques. Upon receipt of the first message (e.g. broadcast transmission) of beacon 115 (125), wireless transmitter 130 (140) can transmit a second message containing the location of the wireless transmitter 130 (140) and the unique identifier of the beacon 115 (125) to the cellular network 150. In various embodiments, the second message can include a timestamp of receipt of the first message (e.g. broadcast transmission) of beacon 115 (125). The second message may be transmitted by the cellular network to a communication gateway 160. The communication gateway may convert the second message to a suitable protocol for delivery over the Internet 170 to a location and tracking server 180.

Location and tracking server 180 receives the second message (or information contained therein) and associates the location of the second communication device (e.g. wireless transmitter) 130 (140) with the location of the first communication device (e.g. beacon) 115 (125) at a time of receipt of the second message. The associated results from location and tracking server 180 can be made available to a user interface 190 which can display the location associated with the beacon 115 (125) for a given point in time. In various embodiments, wireless transmitter 130 (140) transmits the second message over communication gateway 160 as a streaming data source or as a sensor input to a cloud computing environment including predictive service cores, a rules manager, and a rules/decision engine module such as described in U.S. patent application Ser. Nos. 14/039,771 and 14/279,526, the entirety of the disclosures which are incorporated herein by reference. In various embodiments, a rules/decision engine module in the location and tracking server 180 analyzes spatial, temporal, and/or data elements in the second message received over communication gateway 160 and/or other streaming data streams, and/or static (e.g. BOL, SKU, schedule, etc.) or forensics (e.g. learned ship schedule, stop sequencing behavior, port turnaround time, etc.) data, to determine if the received data is a candidate for any of the rules associated with rules manager for a user, a group of users, or all of the users of a cloud computing system. In various embodiments, the spatial, temporal, and/or contextual elements of the received data can be indexed in distributed working memory (e.g. a plurality of in-memory distributed data structures) as a function of rules from a rules manager for which the received data has been identified as a candidate. In various embodiments, location and tracking server 180 is a server component of a rules/decision engine module. In one embodiment, wireless transmitter 130 (140) can generate a location message every time it receives a broadcast message from beacon 115 (125).

In another embodiment, second communication device (e.g. wireless transmitter) 130 (140) can generate a location message periodically, based on time since last transmission, change in location from last transmission, or some other selectable metric. In this architecture, first communication device 115 (125) is a simple low cost beacon which does not require location determining functionality. Rather, the beacon 115 (125) takes advantage of the existing functionality of wireless transmitter (e.g. 130 (140)).

In various embodiments, a rules/decision engine module in the location and tracking server 180 may transmit a set of location determining rules to a wireless transmitter (e.g. 130 (140)) such that the wireless transmitter is designated as a base distributed wireless transmitter to perform functions as a rules manager within an ad hoc network as described in U.S. patent application Ser. No. 14/279,526, the entirety of the disclosure which is incorporated herein by reference. In various embodiments, the base distributed wireless transmitter may transfer the set of location determining rules, or a subset of such rules, to other wireless transmitters.

In one embodiment, the periodic location transmissions of second communication device (e.g. wireless transmitter) 130 (140) can be stored in a database 185 associated with location and tracking server 180 to assist in tracking the movement of the container 100 associated with the first communication device (e.g. beacon) 115, the movement of individual packages 120 in the container 100 associated with the first communication device (e.g. beacon) 125, and/or the movement of individual products (not shown) in respective individual packages 120 associated with a first communication device (e.g. beacon) (e.g. 115, 125). In various embodiments, a rules/decision engine module may analyze the received periodic location data and/or other streaming data streams, and/or other static and/or forensics data, to determine if the received data is a candidate for any of the rules associated with rules manager for a user, a group of users, or all of the users of a cloud computing system such as described in U.S. patent application Ser. Nos. 14/039,771 and 14/279,526, the entirety of the disclosures which are incorporated herein by reference. In various embodiments, the spatial, temporal, and/or contextual elements of the received periodic location data and/or other elements of other streaming data streams, and/or other elements of other static and/or forensics data sources, can be indexed in distributed working memory as a function of rules from a rules manager for which the received data has been identified as a candidate. As discussed below, location and tracking server 180 can control the operation of the beacon 115 (125) including assigning/changing the unique identifier for the beacon 115 (125), the transmit power level of the beacon 115 (125), the timing of the transmission of the identification messages, clustering of beacons 115 (125), and sleep and wake-up modes for the beacons 115 (125). In various embodiments, location and tracking server 180 can control the operation of the beacon 115 (125) using the spatial, temporal, and/or contextual elements indexed in distributed working memory.

In a similar fashion, beacon 125 associated with individual package 120, and/or a beacon (e.g. 115, 125) associated with individual merchandise (not shown), can broadcast its unique identifier to wireless transmitter 130 which can generate a location message for individual package 120

(and/or individual merchandise (not shown)) to be ultimately received by location and tracking server 180 through the cellular network 150 and Internet 170.

In one embodiment, wireless transmitter 130 can be a smart phone in the possession of the driver of the truck 110. In one embodiment, wireless transmitter 130 can be a smart phone in possession of a person sitting at a café near a street that is on a travel path of truck 110. In another embodiment, a dedicated transmitter 140 can be used to receive the unique identifier of the beacon 115 (125) and append the location of the wireless transmitter 140 to the beacon identifier for transmission to the location tracking server 180.

In one embodiment, wireless transmitter 130 (140) uses a satellite communications protocol to transmit the location message to satellite 165. The location message for beacon 115 (125) can be transmitted by satellite 165 to communication gateway 160 for delivery to the location and tracking server 180 via Internet 170. In one embodiment, location and tracking server 180 is run on satellite 165. In various embodiments, predictive service cores, a rules manager, and/or a rules/decision engine module such as described in U.S. patent application Ser. Nos. 14/039,771 and 14/279,526, the entirety of the disclosures which are incorporated herein by reference, of location tracking server 180 may be run on a satellite 165. In one embodiment, the communication gateway 160 may convert the location message to a suitable protocol for delivery over a satellite communication system for delivery to a location and tracking server 180. In one embodiment, the communication gateway 160 may convert the location message to a suitable protocol for delivery over a satellite communication system and the Internet 170 for delivery to a location and tracking server 180.

In one embodiment, the second communication device (e.g. wireless transmitter) 130 (140) may generate a location message for first communication device (e.g. beacon) 115 (125) that includes the identification of the wireless transmitter 130 (140). The wireless transmitter information can be used by the location and tracking server 180 to identify wireless transmitter 130 (140) as the source of the location message. In one embodiment, the owner of the wireless transmitter 130 (140) may be entitled to remuneration for allowing wireless transmitter 130 (140) to be used to generate and transmit the location message. Location and tracking server 180 may include functionality to determine the amount of remuneration that the user of the wireless transmitter 130, or the user or owner of wireless transmitter 140, is entitled to for use of the wireless transmitter 130 (140).

In another embodiment, the second communication device (e.g. wireless transmitter) 130 (140) does not include functionality to determine its own position. Instead, wireless transmitter 130 (140) includes a location message that contains an identification of the serving base station 150 in a communication from the wireless transmitter 130 (140). The location and tracking server 180 can identify the known location of the serving base station 150 from accessing publically available information. While this location information is not as accurate as using a GPS location of the wireless transmitter, it may be sufficient for some applications in tracking the location of a beacon.

In one embodiment, the mode of transport or conveyance (e.g. truck 100) carrying the shipping container (e.g. 100), individual packages (e.g. 120), or individual products, may not have a second communication device (e.g. wireless transmitter) 130 and 140 associated with it. However, a vehicle 155 (e.g. taxi, rental car, drone, delivery vehicle, etc.) having a second communication device (e.g. wireless transmitter) 145 which travels in close proximity to first communication device (e.g. beacon) 115 (125) may be able to receive a first message (e.g. broadcast message) from first communication device 115 (125). The second communication device (e.g. wireless transmitter) 145 may have GPS location functionality and can generate a second message (e.g. location message) containing the unique identifier of beacon 115 (125) and the location of wireless transmitter 145 determined from a GPS position. The location message can be transmitted to the location and tracking server 180 via the cellular network 150, gateway 160, Internet 170, and satellite 165 as described above. The communication gateway 160 may convert the message to a suitable protocol for delivery over the Internet 170, and/or over a satellite communication system, for delivery to a location and tracking server 180.

In one embodiment, the second communication device (e.g. wireless transmitter) 145 may be a smart phone associated with the driver of vehicle 155 who allows his smart phone to be used to transmit beacon location messages in exchange for some remuneration. In one embodiment, entities (e.g. taxi companies, rental car companies, delivery companies, etc.) who own and/or operate vehicle 155 may receive remuneration to encourage such entities to install and allow, or allow their already installed, wireless transmitters 145 within their vehicles 155 to be used to transmit beacon location messages.

In another embodiment, the second communication device (e.g. wireless transmitter) 130 (145) may be each smart phone associated with respective persons (not shown) not associated with a vehicle (e.g. 155, 110), who each allow his or her respective smart phone to be used to transmit beacon location messages in exchange for some remuneration, and that is respectively located within the communication range of the short range communication protocol used by the first communication device (e.g. beacon) 115 (125).

In another embodiment the second communication device (e.g. wireless transmitter) 130 (140, 145) may have a known, fixed location and therefore does not require any location functionality. Upon receipt of a message from a first communication device (e.g. beacon) 115 (125), the wireless transmitter may transmit a message including the unique identifier for the beacon and the known fixed location of the wireless transmitter 130 (140, 145). For example, a coffee shop may have a WiFi hot spot (not shown) that is able to communicate with a beacon 115 (125) as well as cellular system 150. Because the location of the WiFi hot spot (not shown) is fixed and known, the WiFi hot spot does not need GPS or other type of location functionality. So long as the WiFi hot spot (not shown) is within the communication range of the beacon 115 (125), the location of the hot spot can be used as the location for the beacon.

In various embodiments, telecommunications service providers may receive remuneration to encourage such providers to allow their customers' respective smart phones to be used to transmit beacon location messages. In various embodiments, such remuneration may be passed from such providers to such providers' customers in some form (e.g. direct remuneration, discounted service fees, etc.) to encourage such customers to allow his or her respective smart phone to be used to transmit beacon location messages. In one embodiment, second communication device (e.g. wireless transmitter) 130 (145) may be a smart phone associated with a driver or operator of an industrial vehicle (e.g. a forklift, a crane, etc.) (not shown) or equipment (e.g. pallet truck, cart, etc.) at a particular receiving, distribution, and/or storage location (e.g. a warehouse, a port, a depot, a retail store, etc.) that is moving a container (e.g. container 100), a package (e.g. package 120), or a product (not shown) including a first communication device (e.g. beacon) 115 (125) within the particular receiving, distribution, and/or storage location.

Figure 4:
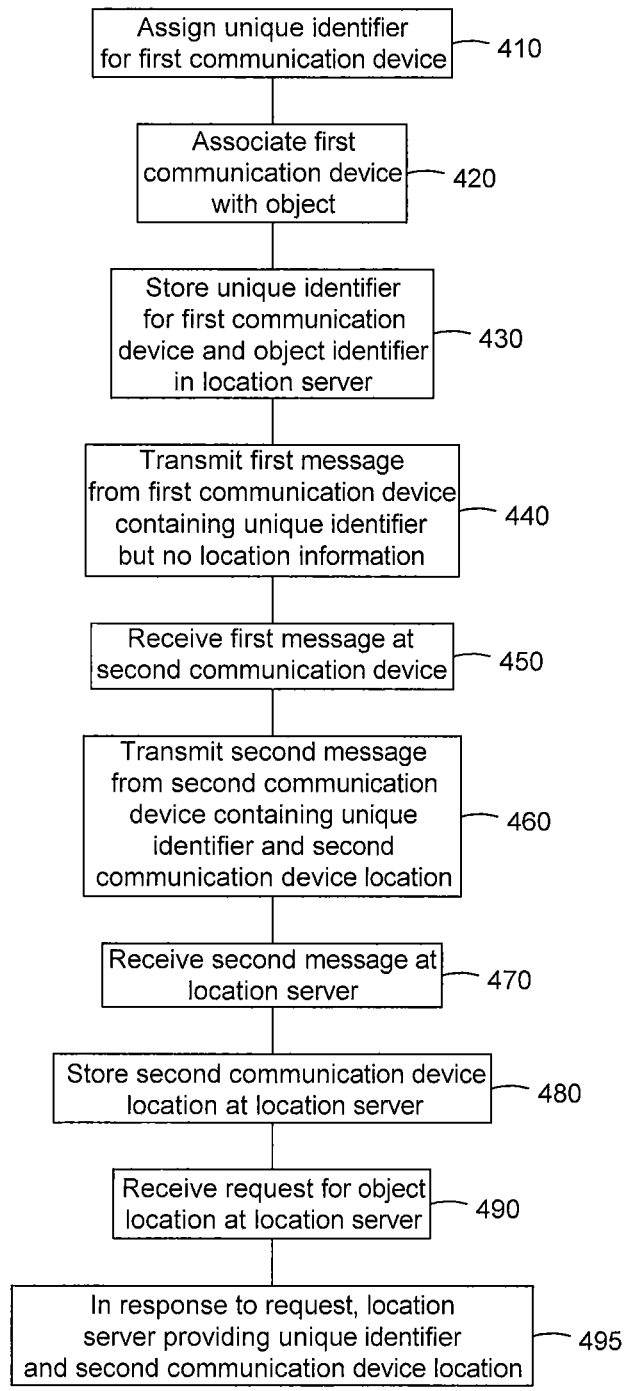
FIG. 4 is a flow chart illustrating a method of tracking the location of an object according to one embodiment of the present disclosure.

Referring now to FIG. 4, a flow chart illustrating a method of tracking the location of an object according to one embodiment of the present disclosure is provided. At block 410, a unique identifier for a first communication device is assigned. In some embodiments, the unique identifier positively identifies the first communication device from a plurality of communication devices. The first communication device does not have the capability to determine its location. In some embodiments, the first communication device is a beacon (e.g. beacon 115, 125, 315). At block 420, the first communication device is associated with an object. In some embodiments, the object is a container (e.g. container 100), a package (e.g. package 120), or a product (not shown). In some embodiments, the object is an object being transported in at least one of a vehicle, a plane, a train and a ship. At block 430, the unique identifier for the first communication device and an identifier for the object associated with the first communication device is stored in a location server. In some embodiments, the location server is a location and tracking server (e.g. location and tracking server 180, 360). At block 440, a first message is transmitted from the first communication device containing the unique identifier of the first communication device. The first message does not include the location of the first communication device. In some embodiments, the first communication device transmits using a short-range communication protocol (e.g. Bluetooth, Bluetooth low energy (BLE), WiFi, LTE Direct, and combinations thereof). In some embodiments, the first message is one of a plurality of messages periodically transmitted by the first communication device. In some embodiments, the periodicity of the transmitted plurality of messages is selectable.

At block 450, the first message transmitted by the first communication device is received at a second communication device. In some embodiments, the second communication device is a wireless transmitter (e.g. 130, 140, 145, 310). At block 460, a second message containing the unique identifier and a location of the second communication device is transmitted from the second communication device. In some embodiments, the second communication device is a mobile telephone and the second message is transmitted using a mobile telephone communications protocol. In some embodiments, the second communication device is a wireless access point and the second message is transmitted using a wireless access point communications protocol. In some embodiments, the second message includes the time that the location of the second communication device was determined. In some embodiments, the second message includes the time that the first message was received by the second communication device. In some embodiments, the location of the second communication device is determined by the second communication device using GPS positioning techniques. In some embodiments, the location of the second communication device is determined using at least one of time of arrival (TOA), time difference of arrival (TDOA) and angle of arrival (AOA) positioning techniques. In some embodiments, the second message is one of a plurality of messages periodically transmitted by the second communication device. In some embodiments, the periodicity of the transmitted plurality of messages is selectable.

At block 470, the second message is received at the location server. At block 480, at the location server, the location of the second communication device is stored. In some embodiments, at the location server, the location of the second communication device is associated with the first communication device. In some embodiments, the step of associating the location of the second communication device with the first communication device includes creating a record containing the unique identifier for the first communication device and the location of the second communication device. At block 490, a request for the location of the object is received at the location server. At block 495, in response to the request, the unique identifier for the first communication device and the location of the second communication device is provided at the location server.

Figure 5:
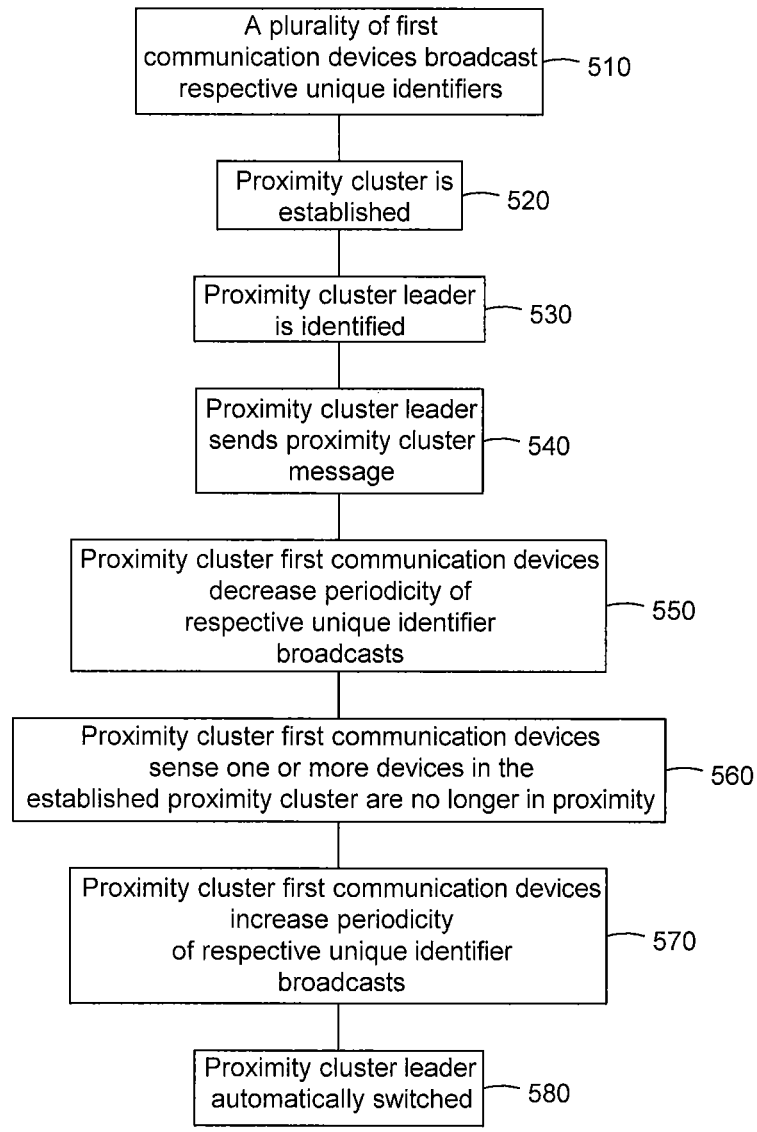
FIG. 5 is a flow chart illustrating a method of tracking the location of an object according to one embodiment of the present disclosure.

In one embodiment, the first communication devices (e.g. beacons) (e.g. 115, 125, 315) may include functionality to create ad hoc networks. Referring now to FIG. 5, a flow chart illustrating a method of tracking the location of an object according to one embodiment of the present disclosure is provided. At block 510, a plurality of first communication devices (e.g. 115, 125, 315) broadcast respective unique identifiers. In some embodiments, the plurality of first communication devices are beacons (e.g. beacon 115, 125, 315). For example, a shipping container (e.g. 100) may include a location beacon (e.g. 115, 125, 315). Inside the shipping container (e.g. 100) may be 3,000 products (e.g. high definition televisions), each with its own location beacon (e.g. 115, 125). Each beacon (e.g. 115, 125, 315) may periodically broadcast its identification code. At block 520, a proximity cluster is established. For example, every other beacon (e.g. 115, 125, 315) located within transmission proximity of the other beacons would receive the periodically broadcasted identification codes of the other beacons and thus establish a proximity cluster. At block 530, a proximity cluster leader is identified. For example, once a proximity cluster is formed, one beacon (e.g. 115, 125, 315) can be identified to be the proximity cluster leader. At block 540, the identified proximity cluster leader may send proximity cluster messages periodically. In some embodiments, the periodicity of the transmitted proximity cluster messages is selectable. For example, the proximity cluster leader may periodically send a proximity cluster message which includes the unique identifiers of all beacons (e.g. 115, 125, 315) in the proximity cluster.

At block 550, the first communication devices in the proximity cluster may decrease the periodicity of their respective unique identifier broadcasts in response to one or more proximity cluster messages. For example, in association with the proximity cluster message periodically sent by the proximity cluster leader, all beacons (e.g. 115, 125, 315) in the proximity cluster that are not the proximity cluster leader may automatically adjust the periodicity of their individual beacon reports. In this way, the duty cycle of the reports for the individual beacons (e.g. 115, 125, 315) can be greatly reduced thereby extending the power requirements for the beacon. In various embodiments, a rules/decision engine module in the location and tracking server 180 transmits a set of proximity cluster rules to a beacon (e.g. a shipping container, or individual package, beacon) (e.g. 115, 125, 315) such that the beacon is designated as a base distributed beacon to perform functions as a rules manager within an ad hoc network as described in U.S. patent application Ser. No. 14/279,526, the entirety of the disclosure which is incorporated herein by reference. In various embodiments, the base distributed beacon may transfer the set of proximity cluster rules, or a sub-set of such rules, to the proximity cluster leader beacon. In some embodiments, the base distributed beacon is the proximity cluster leader beacon.

In one embodiment, the proximity cluster maintains in place, with the proximity cluster leader transmitting periodic proximity cluster messages, and the other beacons (e.g. 115, 125, 315) providing individual identification messages on a much lower duty cycle. At block 560, the first communication devices in the proximity cluster may sense one or more first communication devices (e.g. 115, 125, 315) in the proximity cluster are no longer in proximity (e.g. predetermined range, communication range of short-range communication protocol, etc.). At block 570, the first communication devices in the proximity cluster may increase the periodicity of their respective unique identifier broadcasts in response to sensing that one or more first communication devices are no longer in proximity. In some embodiments, when the individual beacons (e.g. 115, 125, 315) sense that some beacons are no longer in close proximity, such as, for example, by failure to receive an expected identification message from the other beacons, the beacons may return to their normal duty cycle of periodic messages (e.g. broadcast messages). For example, when a shipping container (e.g. 100) reaches its destination, its contents (e.g. individual packages 120, individual products (not shown)) may be removed for further distribution. As the containers (e.g. 100), packages (e.g. 120), and/or products (not shown) are removed from the transportation mode (e.g. truck 110, rail (not shown), plane (not shown), etc.), the packages (e.g. 120) are removed from the container (e.g. 100), and/or the products (not shown) are removed from the container (e.g. 100) or packages (e.g. 120), the individual beacons (e.g. 115, 125, 315) may move outside the transmission range of the other beacons. This is an indication that the proximity cluster is no longer intact, causing the beacons previously associated with the cluster to return to their normal duty cycle reporting, until a new proximity cluster is formed.

At block 580, the proximity cluster leader may be automatically switched. In one embodiment, once a proximity cluster is formed, the leader of the proximity cluster can be automatically switched to another beacon (e.g. 115, 125, 315) in order to prevent the previous lead beacon from unduly draining its power source. Sharing the proximity cluster leader functionality among different beacons in the proximity cluster helps evenly distribute the transmission load among all beacons in the proximity cluster. In various embodiments, the previous proximity cluster leader beacon may transfer a set of proximity cluster rules, or a sub-set of such rules, to the new proximity cluster leader beacon as described in U.S. patent application Ser. No. 14/279,526, the entirety of the disclosure which is incorporated herein by reference.

In another embodiment, formation of proximity clusters can include sub-clusters and be hierarchal in nature. For example, a ship may carry 10,000 containers (e.g. 100), each containing several hundred packages (e.g. 120) and/or several thousand products, each product having a beacon affixed to it. A proximity sub cluster can be formed of all the beacons associated with one container containing several thousand products. A single container may send one reporting message identifying all other beacons contained in the proximity sub-cluster. Likewise, all the containers on a ship can each have a proximity sub-cluster including all packages and/or products in the container, and the group of containers on a ship can be part of a proximity group. In this way, a ship can have a proximity cluster of beacons representing the containers, with each container containing a proximity sub-cluster of beacons associated with the packages and/or products in the container. This allows a single beacon message from a ship to identify the proximity clusters and sub-clusters associated with the ship.

Figure 2:
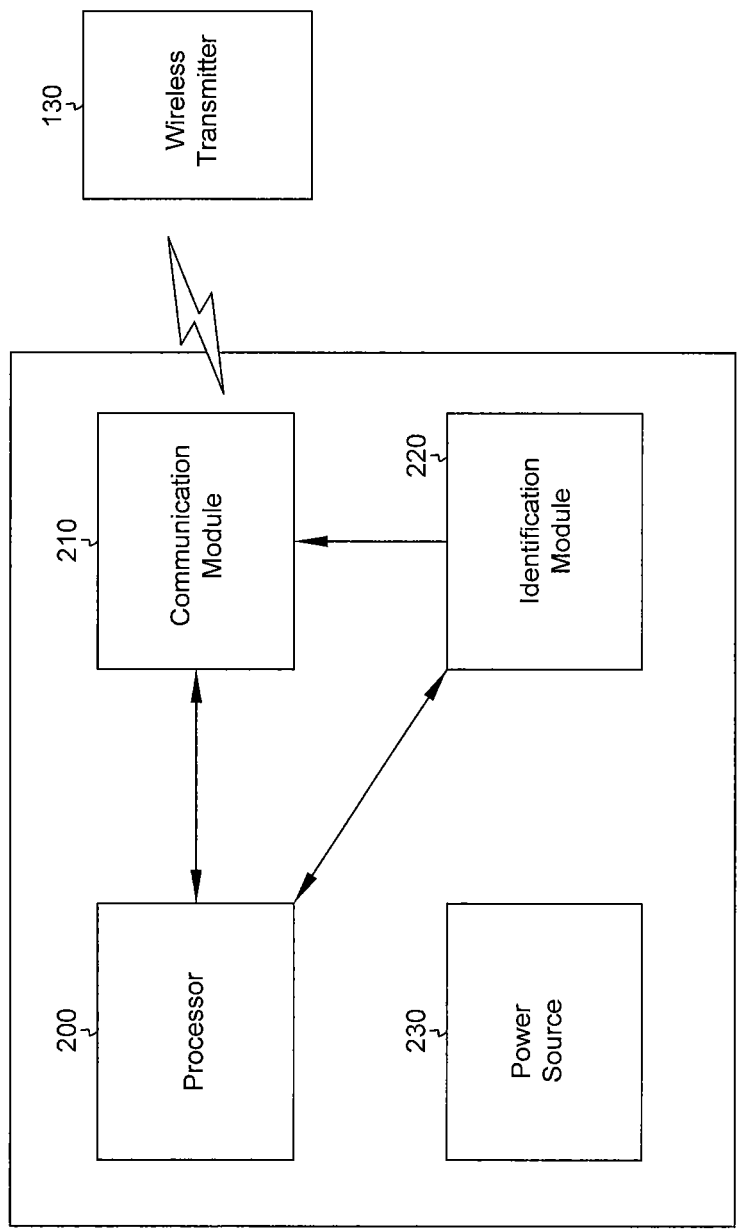
FIG. 2 is an example of a beacon according to one embodiment of the present disclosure.

In one embodiment, beacon 115 and 125 (315) are low cost beacons which provide a periodic broadcast of the unique identifiers for receipt by wireless transmitters, but do not have functionality to receive messages from the wireless transmitters (e.g. 130, 140, 145). In another embodiment, the beacons 115 and 125 include functionality to receive messages from the wireless transmitters (e.g. 130, 140, 145). FIG. 2 shows one embodiment of a beacon (e.g. 115, 125, 315) having a processor 200, communication module 210, identification module 220 and power source 230.

In one embodiment, processor 200 controls the operation of the communication module 210, identification module 220 and power source 230, but does not have functionality to determine its location and is not associated with any sensors. In another embodiment, processor 200 includes location functionality and can receive inputs from sensors (not shown) to determine positioning information for the beacon (e.g. 115, 125, 315).

In one embodiment, communication module 210 includes communication protocols to send and receive messages using Bluetooth Low Energy (BLE), LTE Direct, WiFi, or another short range communication protocol. Communication module 210 can communicate with other beacons (e.g. 115, 125, 315), or with wireless transmitter 130 (140, 145). In another embodiment, communication module 210 only includes functionality to transmit messages but cannot receive messages. In some embodiments, communication module 210 has the ability to transmit at plural power levels to thereby increase the range of the transmitted message. The control of the power level used by the communication module 210 is discussed further below.

In one embodiment, identification module 220 includes a programmable memory for storing a unique identifier associated with the beacon (e.g. 115, 125, 315). The identification module 220 may be programmable by a user using a suitable user interface (not shown). In some embodiments, the identification module 220 may be programmable over the air by a user. The unique identifier may be randomly generated or selectable by the user. The identification module 220 may also be programmed with additional identifying information suitable for the circumstances.

In one embodiment, power source 230 can be a rechargeable battery that provides power to all modules of the beacon (e.g. 115, 125, 315). The battery may be rechargeable using any suitable recharging techniques include solar, kinetic energy harvesting, RF harvesting, or using an AC adapter. The use of a battery power source allows portability of the beacon (e.g. 115, 125, 315) for many different re-use applications. In some embodiments, the power source may be hardwired to a DC or AC electrical source for applications of a fixed or permanent nature.

In other applications, a beacon may include functionality to determine its own positioning information. For example, a beacon (e.g. 115, 125, 315) can include a GPS receiver to determine its latitude and longitude. It can include timing functionality to determine its location based on well-known time of arrival (TOA) and time difference of arrival (TDOA) techniques. It may also include discrete antenna elements in order to determine the angle of arrival (AOA) of received transmission. In another embodiment, the beacon (e.g. 115, 125, 315) may include an accelerometer to detect and quantify movement of the beacon. In another embodiment, the beacon (e.g. 115, 125, 315) may include an altimeter to determine its altitude. The processor can include functionality to determine its location from sensors included in the beacon (e.g. 115, 125, 315), or can send the positioning measurements from the sensors to the location and tracking server for processing.

Figure 3:
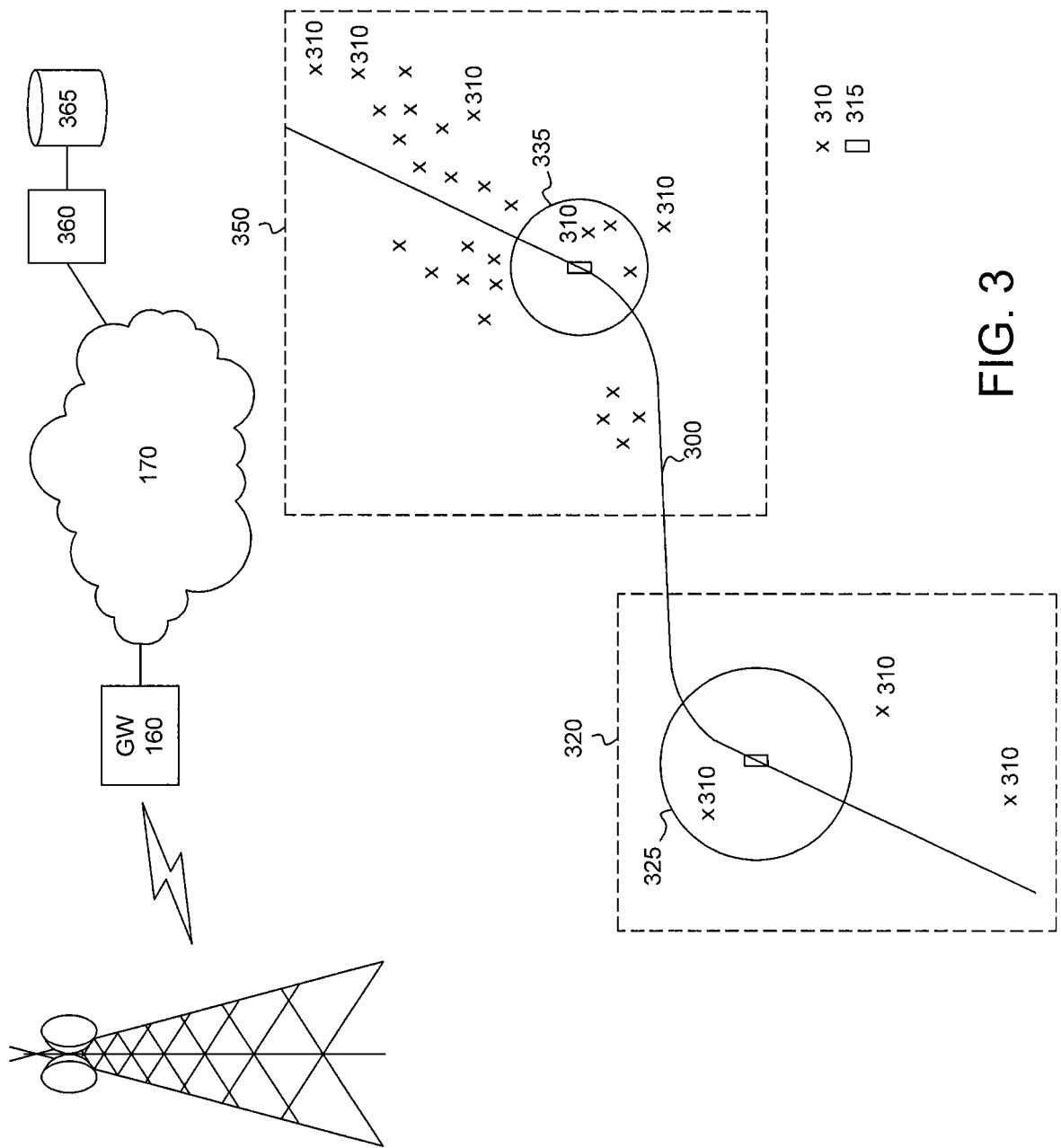
FIG. 3 is an example of a travel path with portions that include densely located wireless transmitters and portions that include scarcely located wireless transmitters.

Because the beacons (e.g. 115, 125, 315) rely on the availability of wireless transmitters (e.g. 130, 140, 145) to provide positioning information and communications connectivity to cellular networks, the present disclosure includes functionality that controls the beacons as a function of the availability of wireless transmitters. With reference to FIG. 3, a desired traveled path 300 may include portions where wireless transmitters 310 are sparsely located 320 and portions where wireless transmitters 310 are densely located 330. For example, travel path 300 may be a highway that passes through rural portions (e.g. 320) where few wireless transmitters (e.g. 310) are located and urban portions (e.g. 330) where wireless transmitters (e.g. 310) are more plentiful. In the portions where wireless transmitters (e.g. 310) are scarce (e.g. 320), it may be useful for the beacons 315 (e.g. 115, 125) to increase their transmit power in order to increase the chance of a wireless transmitter 310 being in the reception range of an identification message transmitted from the beacon. Conversely, in a portion of the travel path 300 where wireless transmitters (e.g. 310) are more plentiful (e.g. 330), the transmit power of the beacon 315 (e.g. 115, 125) can be lowered since it is more likely that the identification message transmitted by the beacon will be within range of at least one of the wireless transmitters (e.g. 310). As shown in FIG. 3, by controlling the transmit power, the transmission range 325 of the beacon 315 can be increased in those portions of the travel path 300 where wireless transmitters (e.g. 310) are sparsely located 320, and the transmission range 335 of the beacon 315 (e.g. 115, 125) can be decreased in those portions where wireless transmitters (e.g. 310) are more densely located 330.

In one embodiment, location server 360 can receive real-time updates of the availability of wireless transmitters (e.g. 310) that are in the vicinity of the desired travel path 300. In various embodiments, a rules/decision engine module in location server 360 analyzes spatial, temporal, and/or contextual data elements in messages received over communication gateway 160 and/or from other streaming data streams, and/or from other static or forensic data sources, to predict the availability of wireless transmitters (e.g. 310) that are in the vicinity of desired travel path 300, and to determine the real-time availability of such wireless transmitters (e.g. 310), as described in U.S. patent application Ser. Nos. 14/039,771 and 14/279,526, the entirety of the disclosures which are incorporated herein by reference. Server 360 can then transmit power commands to beacon 315 (e.g. 115, 125) as a function of the availability of a wireless transmitter 310 to receive the identification message from the beacon 315. In another embodiment, server 360 can access historical data 365 regarding the availability of wireless transmitters (e.g. 310) that are projected to be in the vicinity of the desired travel path 300 such as, for example, from a forensics module as described in U.S. patent application Ser. Nos. 14/039,771 and 14/279,526, the entirety of the disclosures which are incorporated herein by reference.

Likewise, server 360 can control the timing of the identification message transmitted from a beacon 315 (e.g. 115, 125) as a function of the availability of a wireless transmitter 310 to receive the identification message. In areas of the projected travel path 300 where no wireless transmitters (e.g. 310) are located, the server 360 can direct the beacon 315 (e.g. 115, 125) to go into sleep mode to conserve battery power. Once the server 360 determines that a wireless transmitter 310 is projected to be within a transmission range of the beacon 315 (e.g. 115, 125), the beacon 315 can be woken up and directed at the appropriate transmit power level for an identification message to be received by a wireless transmitter 310.

In another embodiment, server 360 can play a more active role in controlling the operation of the beacon 315 (e.g. 115, 125). For example, server 360 determine when to wake up or put beacons (e.g. 315) in sleep mode depending on the projected travel path of the beacons (e.g. 315), the interaction of the beacon 315 (e.g. 115, 125) in a cluster or sub-cluster, input from other sensors. Thus, the beacon 315 (e.g. 115, 125) can be a very simple communication device which conserves battery power, is light-weight, has a smaller form factor, and is safer and server 360 can perform all processing functionality to track the beacons (e.g. 315) and their respective locations.

In various embodiments, a rules/decision engine module in the location server 360 may analyze the spatial, temporal, and/or contextual data elements in messages received over communication gateway 160 and/or from other streaming data streams, and/or from other static and/or forensics data sources (e.g. BOL, SKU, schedule, etc. data sources), to determine if the received data is a candidate for any of the rules associated with beacons (e.g. 315, 125, 115), wireless transmitters (e.g. 310), and/or travel paths (e.g. 300). In various embodiments, the spatial, temporal, and/or contextual elements of the received data may be indexed in distributed working memory based on such rules, one or more of such rules may be determined as satisfied, events may be identified as having satisfied the one or more rules using spatial, temporal, and/or contextual elements indexed in distributed working memory, an indication may be provided that one or more rules are satisfied, and an action may be taken based on one or more rules being satisfied, as described in U.S. patent application Ser. Nos. 14/039,771 and 14/279,526, the entirety of the disclosures which are incorporated herein by reference.

For example, a rule defined in a rules/decision engine module in the location server 360, or distributed to one or more base distributed wireless transmitters (e.g. 310, 130, 140, 145) and/or base distributed beacons (e.g. 315, 115, 125), may direct wireless transmitters (e.g. 310, 130, 140, 145) in proximity to a beacon (e.g. 315, 115, 125) to communicate with the beacon, send an incentive message to a wireless transmitter user (e.g. if you move 10 meters to your left in the next sixty seconds we will pay you $5), modify delivery path 300 (e.g. based on real-time wireless transmitter density), place beacons in sleep mode, wake-up beacons, increase or decrease beacon transmission power, re-direct other resources (e.g. stoplight cameras, buoys with high transmit power, etc.) to assist in tracking beacons.

For privacy considerations, in one embodiment, the identification of the wireless transmitter (e.g. 310, 130, 140, 145) is not included in the location message. Instead, the location data from the wireless transmitter is associated with a beacon (e.g. 315, 115, 125), and thus there is no disclosure that location information was originally associated with the wireless transmitter. In various embodiments, and based on varying privacy laws in varying jurisdictions, location server 360 can dynamically adjust the granularity of the location information transmitted in location messages from wireless transmitters (e.g. 310, 130, 140, 145), and/or output from location server 360, depending on the jurisdiction(s) of the wireless transmitters (e.g. the United Kingdom, Arizona, France). For example, location server 360 can apply rules defined in a rules/decision engine module therein on inbound streams and/or distribute rules to base distributed wireless transmitters (e.g. only transmit coarse grained location information). In some embodiments, location server 360 can disregard location data for all users based on rules associated with the privacy laws of the jurisdiction(s) of the wireless transmitters (e.g. 310, 130, 140, 145). In various embodiments, spatial and/or contextual elements of received data from wireless transmitters (e.g. 310, 130, 140, 145) and/or other streaming, static, or forensics data sources may be indexed in distributed working memory based on such privacy-centric rules, one or more of such privacy-centric rules may be determined as satisfied, and events may be identified as having satisfied the one or more rules, and an action (e.g. dynamically adjust the granularity of the location information transmitted in location messages from wireless transmitters (e.g. 310, 130, 140, 145), and/or output from location server 360) may be taken as a result of the one or more privacy-centric rules being satisfied, as described in U.S. patent application Ser. Nos. 14/039,771 and 14/279,526, the entirety of the disclosures which are incorporated herein by reference.

Figure 6:
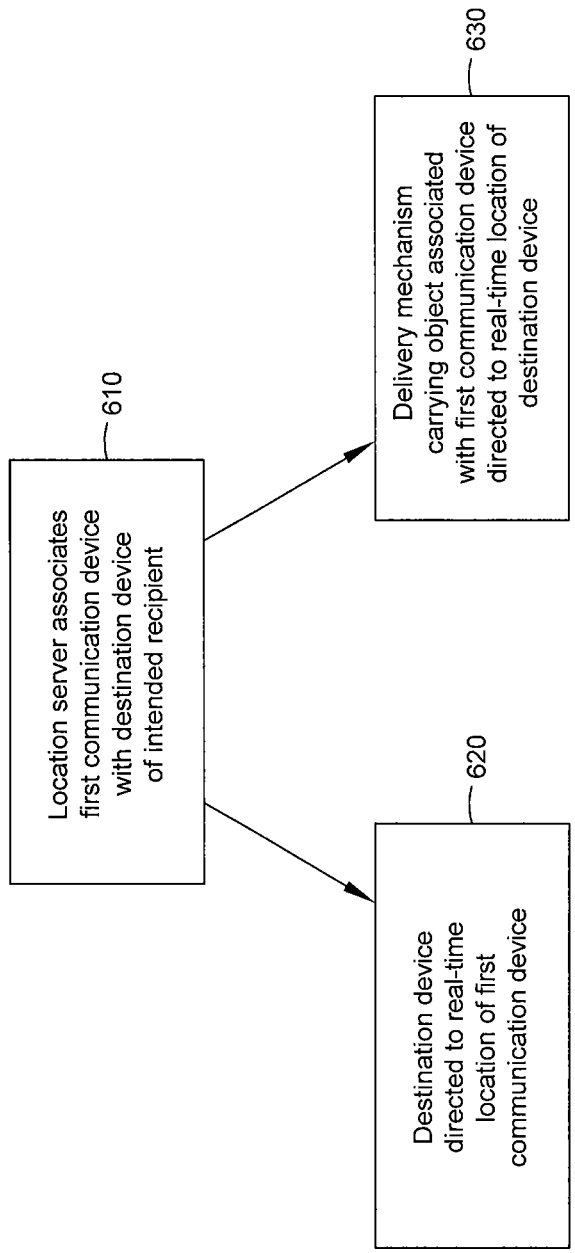
FIG. 6 is a flow chart illustrating a method of tracking the location of an object according to one embodiment of the present disclosure.

Referring now to FIG. 6, a flow chart illustrating a method of tracking the location of an object according to one embodiment of the present disclosure is provided. At block 610, a location server (e.g. 360) associates a first communication device (e.g. beacon 115, 125, 315) with a destination device of an intended recipient. In various embodiments, location server 360 may associate an individual package (e.g. 120) beacon (e.g. 315, 115, 120) or an individual product beacon (e.g. 315, 115, 125) with a destination device of an intended recipient of the individual package or product. At block 620, the associated destination device is directed to a real-time location of the associated first communication device (e.g. 115, 125, 315). At block 630, a delivery mechanism carrying an object (e.g. individual package or product) associated with the first communication device (e.g. 115, 125, 315) is directed to the real-time location of the associated destination device. In various embodiments, as a result of a rule defined in a rules/decision engine module in the location server 360 being satisfied, an action may be taken as described in U.S. patent application Ser. Nos. 14/039,771 and 14/279,526, the entirety of the disclosures which are incorporated herein by reference. For example, a rule defined in a rules/decision engine module in the location server 360, or distributed to one or more base distributed wireless transmitters (e.g. 310, 130, 140, 145) and/or base distributed beacons (e.g. 315, 115, 125), may direct the destination device to the real-time location of the individual package beacon (e.g. 315, 115, 125) or individual product beacon (e.g. 315, 115, 125) or direct a delivery mechanism (e.g. drone, person on a delivery bike, etc.) carrying the individual package and its beacon (e.g. 315, 115, 125), or the individual product and its beacon (e.g. 315, 115, 125), to the real-time location of the destination device.

Thus, the present disclosure is directed to a simple and inexpensive first communication device (e.g. beacon) that takes advantage of second communication devices (e.g. wireless transmitters) of opportunity to provide location functionality and communications functionality that avoids the expenses, resources, weight, and form factor required, and safety concerns, of prior art asset tracking systems.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims. Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter affecting a machine-readable propagated signal, or a combination of one or more of them.

The term "circuitry" encompasses all apparatus, devices, and machines for processing data, including by way of example a programmable processor, a computer, or multiple processors or computers. The circuitry can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What I claim is:

1. A method of tracking the location of an object, comprising:
    assigning respective unique identifiers for a plurality of first communication devices, wherein the plurality of first communication devices do not have the capability to determine their respective location;
    associating each of the first communication devices with a respective object;
    storing the unique identifiers and identifiers for the objects associated with the first communication devices in a location server;
    broadcasting the respective unique identifiers at the plurality of first communication devices;
    establishing a proximity cluster of first communication devices within transmission proximity of each other;
    identifying one of the first communication devices in the proximity cluster as a proximity cluster leader;
    transmitting a first message from the proximity cluster leader containing the unique identifiers of the first communication devices in the proximity cluster, wherein the first message does not include the location of the first communication devices in the proximity cluster;
    receiving at a second communication device the first message transmitted by the proximity cluster leader;
    transmitting a second message from the second communication device containing the unique identifiers of the first communication devices in the proximity cluster and a location of the second communication device;
    receiving the second message at the location server;
    at the location server, associating the location of the second communication device with the first communication devices in the proximity cluster;
    storing at the location server, the location of the second communication device;
    at the location server, receiving a request for the location of one of the objects; and
    at the location server, in response to the request, providing the respective unique identifier and the location of the second communication device.

2. The method of claim 1, where each unique identifier positively identifies the respective first communication device from a plurality of communication devices.

3. The method of claim 1, wherein the first communication devices transmit using a short-range communication protocol.

4. The method of claim 3, wherein the short-range communication protocol includes at least one of Bluetooth, Bluetooth low energy (BLE), WiFi and LTE Direct.

5. The method of claim 1, wherein the objects are objects being transported in at least one of a vehicle, a plane, a train and a ship.

6. The method of claim 1, wherein the second communication device is a mobile telephone and the second message is transmitted using a mobile telephone communications protocol.

7. The method of claim 1 wherein the second communication device is a wireless access point and the second message is transmitted using a wireless access point communications protocol.

8. The method of claim 1, wherein the location of the second communication device is determined by the second communication device using GPS positioning techniques.

9. The method of claim 1, wherein the location of the second communication device is determined using at least one of time of arrival (TOA), time difference of arrival (TDOA) and angle of arrival (AOA) positioning techniques.

10. The method of claim 1, wherein the step of associating the location of the second communication device with the first communication devices in the proximity cluster includes creating a record containing the unique identifiers of the first communication devices in the proximity cluster and the location of the second communication device.

11. The method of claim 1, wherein the second message includes the time that the location of the second communication device was determined.

12. The method of claim 1, wherein the second message is one of a plurality of messages periodically transmitted by the second communication device.

13. A system for tracking the location of an object, comprising:
a plurality of first communication devices having respective unique identifiers, wherein the first communication devices do not have the capability to determine their respective location, and wherein each of the first communication devices is associated with a respective object, the first communication devices being configured to:
broadcast the respective unique identifiers of the plurality of first communication devices;
establish a proximity cluster of first communication devices within transmission proximity of each other; and
identify one of the first communication devices in the proximity cluster as the proximity cluster leader;
a location server configured to store:
the unique identifiers of the first communication devices; and
identifiers for the objects associated with the first communication devices;
a second communication device configured to:
receive a first message transmitted by the proximity cluster leader, wherein the first message includes the unique identifiers of the first communication devices in the proximity cluster and does not include the location of the first communication devices in the first proximity cluster;
transmit a second message including the unique identifiers of the first communication devices in the proximity cluster and a location of the second communication device;
the location server configured to:
receive the second message from the second communication device;
associate the location of the second communication device with the first communication devices in the proximity cluster;
store the location of the second communication device;
receive a request for the location of one of the objects; and
in response to the request, provide the unique identifier of the respective first communication device and the location of the second communication device.

14. The system of claim 13, wherein the first communication devices are beacons configured to transmit the first message using a short-range communication protocol.

15. The system of claim 13, wherein the second communication device is a mobile telephone configured to transmit the second message using a mobile telephone communications protocol.

16. The system of claim 13, wherein the second communication device is a wireless access point configured to transmit the second message using a wireless access point communications protocol.

17. The system of claim 13, further comprising a database associated with the location server configured to store a record containing the unique identifiers of the first communication devices in the proximity cluster and the location of the second communication device.

18. A system for tracking the location of an object, comprising:
a plurality of first communication devices having respective unique identifiers, wherein the first communication devices do not have the capability to determine their respective location, and wherein each of the first communication devices is associated with a respective object, the first communication devices being configured to:
broadcast the respective unique identifiers of the plurality of first communication devices;
establish a proximity cluster of first communication devices within transmission proximity of each other; and
identify one of the first communication devices in the proximity cluster as the proximity cluster leader;
a location server;
a database associated with the location server configured to store:
the unique identifiers of the first communication devices; and
identifiers for the objects associated with the first communication devices;
a second communication device configured to:
receive a first message transmitted by the proximity cluster leader, wherein the first message includes the unique identifiers of the first communication devices in the proximity cluster and does not include the location of the first communication devices in the first proximity cluster;
transmit a second message including the unique identifiers of the first communication devices in the proximity cluster and a second communication device location;
the location server configured to:
receive the second message from the second communication device;
associate the second communication device location with the first communication devices in the proximity cluster;
store the second communication device location in the database;

receive a request for the location of one of the objects; and in response to the request, provide the unique identifier of the respective first communication device and the second communication device location.

19. The method of claim 1 further comprising:

transmitting periodic proximity cluster messages from the proximity cluster leader to the plurality of first communication devices that are not the proximity cluster leader; and in response to one or more of the periodic proximity cluster messages, automatically adjusting the periodicity of respective unique identifier broadcasts by the plurality of first communication devices that are not the proximity cluster leader.

20. The method of claim 10 wherein the periodicity of the transmitted proximity cluster messages is selectable.

* * * * *